United States Patent

[11] 3,601,859

| | | |
|---|---|---|
| [72] | Inventor | Hans-Werner Selbach<br>Lohe, Germany |
| [21] | Appl. No. | 779,182 |
| [22] | Filed | Nov. 26, 1968 |
| [45] | Patented | Aug. 31, 1971 |
| [73] | Assignee | Firma Rolf Kestermann Maschinenfabrik<br>Bad Oeynhausen, Germany |
| [32] | Priority | Dec. 5, 1967 |
| [33] | | Germany |
| [31] | | P 17 29 184.8 |

[54] PLASTIFYING SCREW ASSEMBLY FOR EXTRUSION AND INJECTION-MOLDING PRESSES
6 Claims, 5 Drawing Figs.

[52] U.S. Cl.................................................. 18/12 SP,
18/12 SR, 259/6
[51] Int. Cl...................................................... B29f 3/00
[50] Field of Search............................................ 18/12 SF,
12 SP, 12 SR; 259/6, 104; 146/1 NG

[56] References Cited
UNITED STATES PATENTS
2,434,707  1/1948  Marshall.......................... 259/6 X
3,109,196  11/1963  Schmidt ......................18/12 (SF) UX
3,254,367  6/1966  Erdmenger................... 18/12 SP UX
3,407,439  10/1968  Gregory ....................... 18/12 SF UX

*Primary Examiner*—Andrew R. Juhasz
*Assistant Examiner*—Leon Gilden
*Attorney*—Karl F. Ross ABSTRACT: A plastifying worm assembly for extrusion presses and injection-molding presses adapted to shape a thermoplastic material in which the worm, worm cylinder, worm-drive gears and thrust-bearing assembly constitute a replaceable unit of predetermined plastifying characteristics adapted to be mounted interchangeably with other units upon a drive structure constituting the second unit of the assembly. The drive structure includes the motor and transmission means including drive gears adapted to mesh with the worm-drive gears of the processing unit. The gears of the interchangeable units are meshable with the driving gears of the drive unit and have the same gear-tooth characteristics except for the number of teeth.

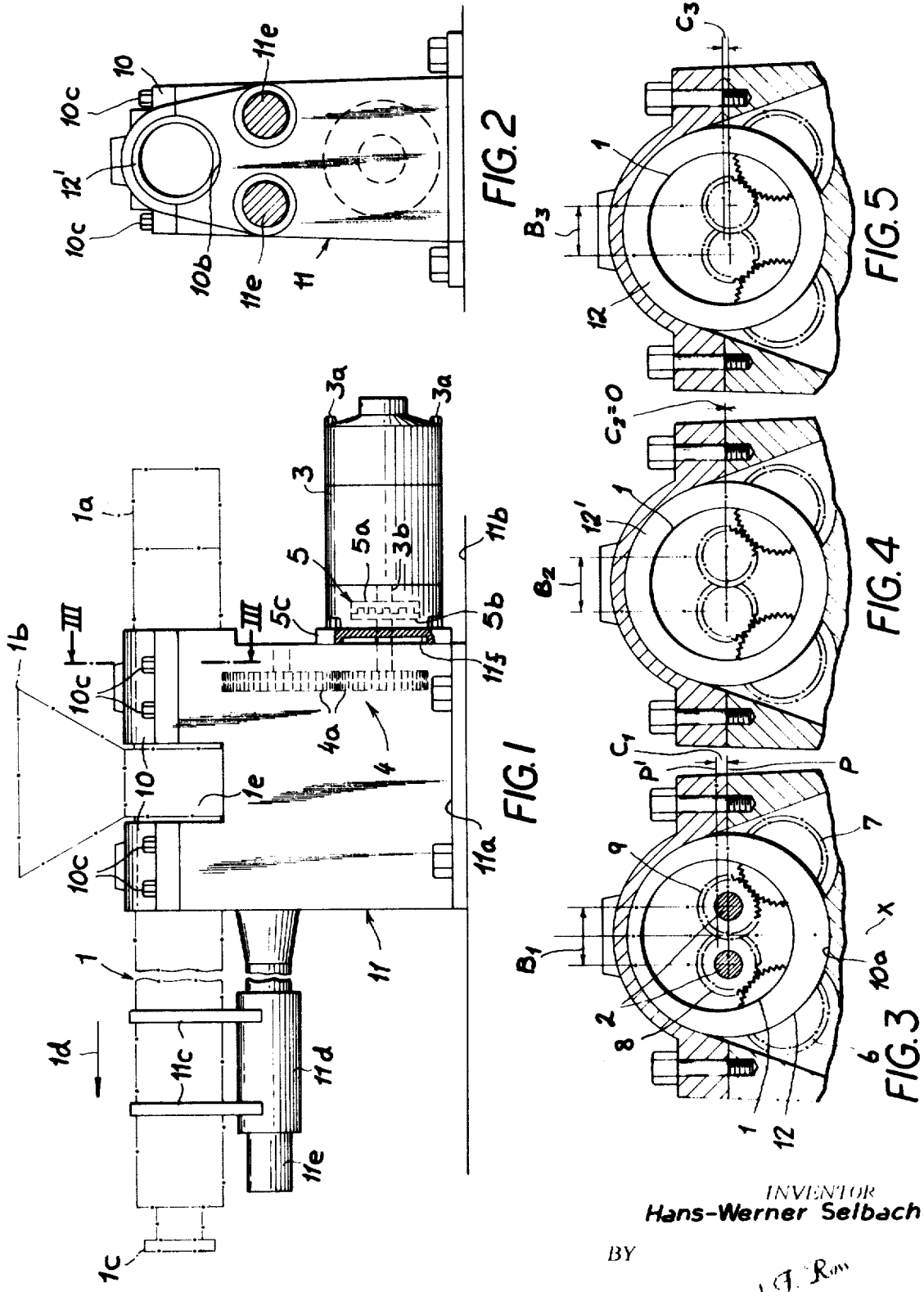

PLASTIFYING SCREW ASSEMBLY FOR EXTRUSION AND INJECTION-MOLDING PRESSES

The present invention relates to a plastifying screw assembly for extrusion-molding or injection-molding apparatus.

In the commonly assigned copending application Ser. No. 666,311, filed Sept. 8, 1967, there is described an improvement in screw-type or worm-type plastifying and masticating devices for thermoplastic synthetic resin material. In that application, it is pointed out that masticators for plastifying thermoplastic synthetic resin by the interaction of mechanical shearing, heat and pressure, may include one or more worms which rotate within worm cylinders or housings to produce the shearing action between the flanks of the worms when the pitch decreases for the inlet side to the outlet side or between flanks of intermeshing generally parallel worms adapted to squeeze the plastic material between the lands and threads and the grooves of the mating portions of the worms while imparting to the thermoplastic mass the compression necessary for rendering it fluid and homogenous.

In the above-identified application, two such intermeshing worms with decreasing groove width are described in a system for the degassification of the thermoplastic material. In that system, the rotatable screw means has meshing threads or lands adapted to masticate and compress the thermoplastic synthetic resin material and is subdivided into an inlet zone, a compression zone, an expansion zone and a discharge zone in accordance with the size of the helical channels formed between the threads or ridges of the worms. The compression zone, of course, has a smaller flow cross section than the expansion zone for the synthetic resin material. The transition between the compression zone and the expansion zone is formed by a plate extending across the generally cylindrical masticator bore and lying in a plane perpendicular to the axis of the worm or worms while filling the gap between the worm or worms and the surrounding masticator wall. This transition plate has respective arrays of passages for the throughflow of the material (thermoplastic synthetic resin) to be degassed from the compression zone worm to a second set of worms in the expansion chamber for the further advance of the degassed material to the extrusion or injection-molding dies.

Along the forward face of the perforated plate or disk, in the direction of flow of the thermoplastic material in the course of plastification, there is provided one or more cutting edges preferably coupled with the respective worms and adapted to sweep the plate and sever the strands of plastic material as they are extruded through the bores in the plate. Upon being forced through these bores, the material is exposed to the low pressure in the expansion zone and, by virtue of the sudden relief of ambient pressure, readily releases any entrapped gases. The latter are then evacuated through a wall of the masticator bore ahead of this perforated plate.

In the basic construction of plastifying worm assemblies, the plastifying worm or worms are mounted in a masticator bore of the character described previously and formed in a generally cylindrical housing having an inlet for the comminuted thermoplastic synthetic resin at one side and an outlet for the fluidized thermoplastic at the other. In most systems, the worm arrangement is built onto a housing structure which is also formed with mounting means for attaching the drive motor for the worm, the assembly being more or less permanent and allowing only for replacement of parts suffering excessive wear or breakdown. Such assemblies have been found to be somewhat disadvantageous inasmuch as the housing structure must take up the axial stress of the reaction force applied to the thrust bearings and the worm-journaling means by which the worms are set in the masticator housing. Furthermore, various applications of the plastifying technique have shown that certain thermoplastics require worms of different characteristics for optimum homogenization and fluidification. Thus, the operator of an extrusion-molding or injection-molding machine may deem it desirable to use longer plastification and mastication assemblies at some time and shorter assemblies at others. Frequently it is desirable to use a single-worm unit whereas, at other occasions, plural-worm or multiworm units may be desirable. Prior art systems of the general character described were incapable of modification along these lines.

Consequently, it has been proposed to provide plastifying assemblies including the drive motor, gearing and worm which could be mounted upon the press or removed therefrom. In these systems, costs were high because of the need for complex assemblies, and because the assembly was incapable of adequate separation of its parts and thus was characterized by some of the disadvantages described earlier in conjunction with prior art assemblies.

It is therefore the principal object of the present invention to provide an improved plastifying and masticating worm assembly wherein the aforementioned disadvantages can be avoided and a wide variety of processing techniques can be accumulated with a minimum of equipment, difficulty and cost.

The attainment of this object, and others which will become apparent hereinafter, is achieved by means of an assembly wherein a processing unit is removably adapted to a drive unit and is interchangeable with other processing units, as will become apparent hereinafter. The term "processing unit" is used herein to describe the worm cylinder, i.e. the housing structure which may have a cylindrical bore and is formed at one side with a hopper or other inlet arrangement for the thermoplastic synthetic resin and is formed at the other end with an outlet for discharging the fluid resin. In addition, the processing unit comprises at least one worm but also two or more worms as desired, a multiple-worm assembly having the worms mounted in the common masticating bore and ridges and threads in interfitting or meshing relationship.

At the end remote from the discharge side or outlet, the worms are provided with the usual worm-drive gears (see the aforementioned application and can be rotated to advance the thermoplastic material through the bore. The processing unit also includes the journaling assembly by which the rotatable worms are held in the worm housing, including the thrust bearings which takeup the axial forces generated by the discharge of the thermoplastic material at high pressure and the reaction forces applied by thermoplastic to the worm in the direction opposite to the direction of displacement of the thermoplastic material.

The drive unit, in accordance with the present invention, comprises a motor and gearing, adapted to mesh with the worm-drive gears of the processing unit. According to a more specific feature of this invention, the drive unit includes a support housing or stanchion on which the worm assembly is cradled and is provided with at least one driving gear (driven by the motor of this unit) adapted to mesh with the worm-drive gear. The worm-drive gear of the interchangeable processing units are formed with gear teeth of identical parameters with the exception of a number of teeth on the worm-drive gear, whenever differing numbers of teeth are part of the desired variation in the processing characteristics of the system. The support structure or post supports the entire housing of the worm assembly and therefore need not itself be as massive as the housing structure adapted to take up the reaction forces, and moreover, the post itself may form a support adapted to be removably mounted upon the machine frame.

The units may be provided with interengageable seats, flanges, flanks, fittings or mating portions which, upon assembly of the device, constitute of the assembly a closed unit. Consequently, the processing units which are interchangeable one with another can have different lengths (10, 12, or 15 times the diameter of the masticating chamber) with gears of identical numbers of teeth, or smaller cylinder bores and masticating chambers may be used with smaller diameter worms and a corresponding reduction in the number of gear teeth or suction devices may be provided with or without expansion chambers and described in the aforementioned copending application, or venting of the gases may be carried out with or without suction or in respective processing units.

The number of possible processing unit combinations is increased when it is recognized that each of the foregoing variations may be used with one, two or more worms as is known in the art although preferably the plasticizing system includes at least two worms whose axes lie in a common horizontal plane. The worm-drive gears of this assembly then also have coplanar axes and it is preferred to provide a cradle structure of the fixedly positioned driving gears such that each of these driving gears meshes with a respective worm-driving gear and the pair of worm-driving gears in received within the cradle formed between the drive gears. The spacing of the drive gears need not be varied in spite of the fact that the worms of a two-worm system mesh to a greater or lesser extent or have large or small diameters or an interaxial spacing.

This latter construction has been found most advantageous since it is known in the plastifying art that optimum mastication and fluidication of the thermoplastic synthetic resin depends to a large measure on the geometry of the worm and particularly upon the diameter of the latter. The shape of the worm appears to be of secondary significance. These considerations appear to hold true for plural-worm presses in general as well as for single-worm presses. Since the diameters of the worms in double-worm presses are related to the spacing between the axis in the common axial plane of the worms, smaller worms are cradled lower between the drive gears than larger worms. To ensure proper positioning of the assembly for worms of different types, the support for the worm housing may be formed with a cylindrical passage in which the housing of the worm unit is received, compensation for the higher and lower positions of the axis of the worms being achieved with eccentric rings.

The above and other objects, features and advantages of the present invention will become more readily apparent from the following description, reference being made to the accompanying drawing in which:

FIG. 1 is a side elevational view of a plastifying press for an extrusion or injection-molding machine in which the worm unit is shown in dot-dash lines:

FIG. 2 is s front view of the assembly;

FIG. 3 is a cross-sectional view taken along the line III—III of FIG. 1; and

FIGS. 4 and 5 are views similar to FIG. 3 showing accommodation of different processing units in the assembly.

In the drawing, there is shown a plastification press of the two-worm type described, for example, in the above-identified copending application. The press which has a pedestal 11, was serving as the transmission of the drive unit, has flange 11a whereby the assembly can be removably mounted upon the housing 11b of an extrusion-molding device. In FIG. 1, the processing unit which can be seen to be a masticating and extrusion housing formed at its rear end 1a with the thrust bearings of the worms, with a hopper 1b for introducing the thermoplastic synthetic resin into the cylindrical housing 1 and with a discharge head 1c which may be constituted as the extrusion die or may feed the latter. The projecting end of the housing 1 in the direction of advance of the synthetic resin material, arrow 1d, is supported by a pair of brackets 11c which are mounted upon an adjustable slide 11d carried on the rails 11e. At 2, there are represented the shafts of the two worms of processing unit 1 with their respective worms drive wheels 8, 9 which may be of the type described in the aforementioned application of those of similar worm presses.

The drive unit comprises a motor 3 connected in an assembly with a clutch 5 by the bolts 3a, the shaft 3b of the motor 3 driving one side 5a of the clutch while the other side 5b operates the transmission 4. The assembly 3, 5 is mounted by a flank 5c on the pedestal 11 which is formed with a boss 11f to center the assembly 3, 5 properly. Thus, the structure 3, 4, 5 constitutes the other unit of the assembly, the worm assembly 1, etc. being replaceable and interchangeable with corresponding assemblies of other parameters.

The housing 11 is formed with a pair of seats 10a, 10b adapted to receive the masticating cylinder 1 and cooperating with shell-like housing portions or hoods 10 which are bolted at 10c to the housing 11 to removably retain the processing assembly 1 etc. in place A collar 1e on the cylinder constitutes a formation mating with the support 11 for centering or positioning the processing unit. The transmission 4 includes a pair of drive gears 6 and 7 which are transversely spaced and form between them a cradle in which the gears 8 and 9 are received. The gears 8 and 9 of the several interchangeable processing units may have different interaxial spacings $B_1$, $B_2$ and $B_3$ and may be located at different distances above or below (or in) the axial horizontal median plane P through the system as represented dimensions $C_1$, $C_2$ and $C_3$ of the assembly. The gears 6 and 7 in this embodiment are driven in opposite senses by the gearing represented at 4a although it will be understood that for worm presses with worms operating in the same sense, the gears 8 and 9 would be spaced apart to a greater extent (without overlap) and meshing of the worms would be precluded.

The interaxial spacing for the systems shown in FIGS. 3–5 of the gears 6 and 7 is constant whereas the interaxial spacing $B_1$, $B_2$ and $B_3$ of the driven gears 8, 9 are progressively reduced and correspondingly reduced numbers of teeth are provided for these gears. The tooth count of the worm-drive gears 8 and 9 are a measure of the interaxial spacings $B_1$, $B_2$ and $B_3$, the worms being cradled respectively between the gears 6, 7. To compensate for this deviation of the plane P' of the axis of the worms from the plane P, there are provided eccentric rings 12 or spacer rings 12' between the members 10 and 10a.

The improvement described and illustrated is believed to admit of many modifications within the ability of persons skilled in the art, all such modifications being considered within the spirit and scope of the invention except as limited by the appended claims.

1. A plastification and mastication worm assembly comprising a processing unit including at least one worm housing, a worm rotatable in said housing and provided with gear means including at least one downwardly exposed worm-drive gear, and bearing means for rotatably supporting said worm in said housing; a drive unit including a motor, a support for said housing, and a transmission in said support driven by said motor and provided with at least one driving gear, said support having at least one further gear spaced from said driving gear and forming a cradle therewith; and means for interchangeably mounting said processing unit on said drive unit with said gear means meshing with said driving and further gears and received in said cradle with said worm-drive gear in mesh with said driving gear, said processing unit being interchangeable with other processing units having respective worm-drive gears adapted to mesh with the driving gear of said transmission, said support being provided with a seat for said worm housing and means for removably clamping said worm housing on said support.

2. The assembly defined in claim 1 wherein the worm-drive gears of said processing units have the same gear-tooth parameters except for tooth number.

3. The assembly defined in claim 1, further comprising a clutch interposed between said motor and said transmission, said clutch and said motor being mounted on said support.

4. The assembly defined in claim 1 wherein said transmission includes a pair of coplanar driving gears with horizontal spacing, the processing unit mounted on said support including a pair of parallel horizontal worms each having a respective worm-drive gear, adapted to mesh with the respective driving gear of said transmission whereby pairs of worm-drive gears of the interchangeable processing units with differing numbers of gear teeth are cradled between the driving gears of said transmission.

5. The assembly defined in claim 1, further comprising eccentric rings supporting said processing units at different heights on said support.

6. In an extruding machine, in combination:
   a horizontally elongated machine housing having a support post at one end thereof forming an upwardly concave cradle;

a motor-driven transmission in said support including at least one upwardly exposed driving gear extending into said cradle;

a processing unit comprising a casing forming an elongated mastication chamber, said casing being seated at one end thereof in said cradle, at least one worm journaled in said casing, and at least one worm-driving gear downwardly exposed through said casing and operatively connected with said worm while meshing with said driving gear upon seating of said casing on said cradle;

clamping means engaging said casing from above for releaseably retaining same on said support; and holding means spaced from said support along said housing for supporting said casing.